United States Patent
Sato

(10) Patent No.: US 7,865,292 B2
(45) Date of Patent: Jan. 4, 2011

(54) THROTTLE CONTROLLING APPARATUS FOR DIESEL ENGINE WITH SUPERCHARGER

(75) Inventor: Masaaki Sato, Susono (JP)

(73) Assignee: Toyota Jidosha Kabushiki Kaisha, Aichi-Ken (JP)

(*) Notice: Subject to any disclaimer, the term of this patent is extended or adjusted under 35 U.S.C. 154(b) by 275 days.

(21) Appl. No.: 12/265,074

(22) Filed: Nov. 5, 2008

(65) Prior Publication Data

US 2009/0118979 A1 May 7, 2009

(30) Foreign Application Priority Data

Nov. 6, 2007 (JP) .............................. 2007-288501

(51) Int. Cl.
  G06F 19/00 (2006.01)
  F02D 23/02 (2006.01)
  F02B 33/44 (2006.01)
(52) U.S. Cl. ................... 701/103; 123/559.1; 60/600; 60/611
(58) Field of Classification Search ................. 123/361, 123/378, 396, 399–403, 559.1, 564, 568.22; 60/600–603, 611, 612; 701/101–103, 110, 701/115
See application file for complete search history.

(56) References Cited

U.S. PATENT DOCUMENTS 5,137,105 A * 8/1992 Suzuki et al. ............... 180/197
5,289,684 A * 3/1994 Yoshioka et al. ............ 60/612
5,481,462 A    1/1996 Nagai
5,899,069 A * 5/1999 Watanabe .................... 60/602
6,076,352 A * 6/2000 Hayashi ...................... 60/602
6,318,083 B1 * 11/2001 Machida et al. ............. 60/601

FOREIGN PATENT DOCUMENTS

| JP | 06-146991 A | 5/1994 |
| JP | 9-60559 A | 3/1997 |
| JP | 09-287505 A | 11/1997 |
| JP | 2002-327643 A | 11/2002 |
| JP | 2005-315081 A | 11/2005 |
| JP | 2006-249950 A | 9/2006 |

* cited by examiner

*Primary Examiner*—Willis R Wolfe, Jr.
(74) *Attorney, Agent, or Firm*—Sughrue Mion, PLLC

(57) ABSTRACT

An apparatus for controlling a throttle opening degree of a diesel engine with a supercharger is disclosed. The apparatus includes an electronic control unit having functions of detecting section, a computing section, a correcting section, and a correction limiting/inhibiting section. The detecting section detects the atmospheric pressure, and the computing section computes an atmospheric pressure correction value with respect to the throttle opening degree based on the detected atmospheric pressure. The correcting section corrects the throttle opening degree in accordance with the atmospheric pressure correction value. When the degree of separation of an actual charging pressure from a target charging pressure in the supercharger is les than a predetermined value, the correction limiting/inhibiting section limits or inhibits correction of the throttle opening degree in accordance with the atmospheric pressure correction value.

12 Claims, 4 Drawing Sheets

| Atmospheric Pressure | 60 | 70 | 80 | 90 | 97 | 110 |
|---|---|---|---|---|---|---|
| Atmospheric Pressure Correction Value | 0.6 | 0.7 | 0.8 | 0.9 | 1 | 1 |

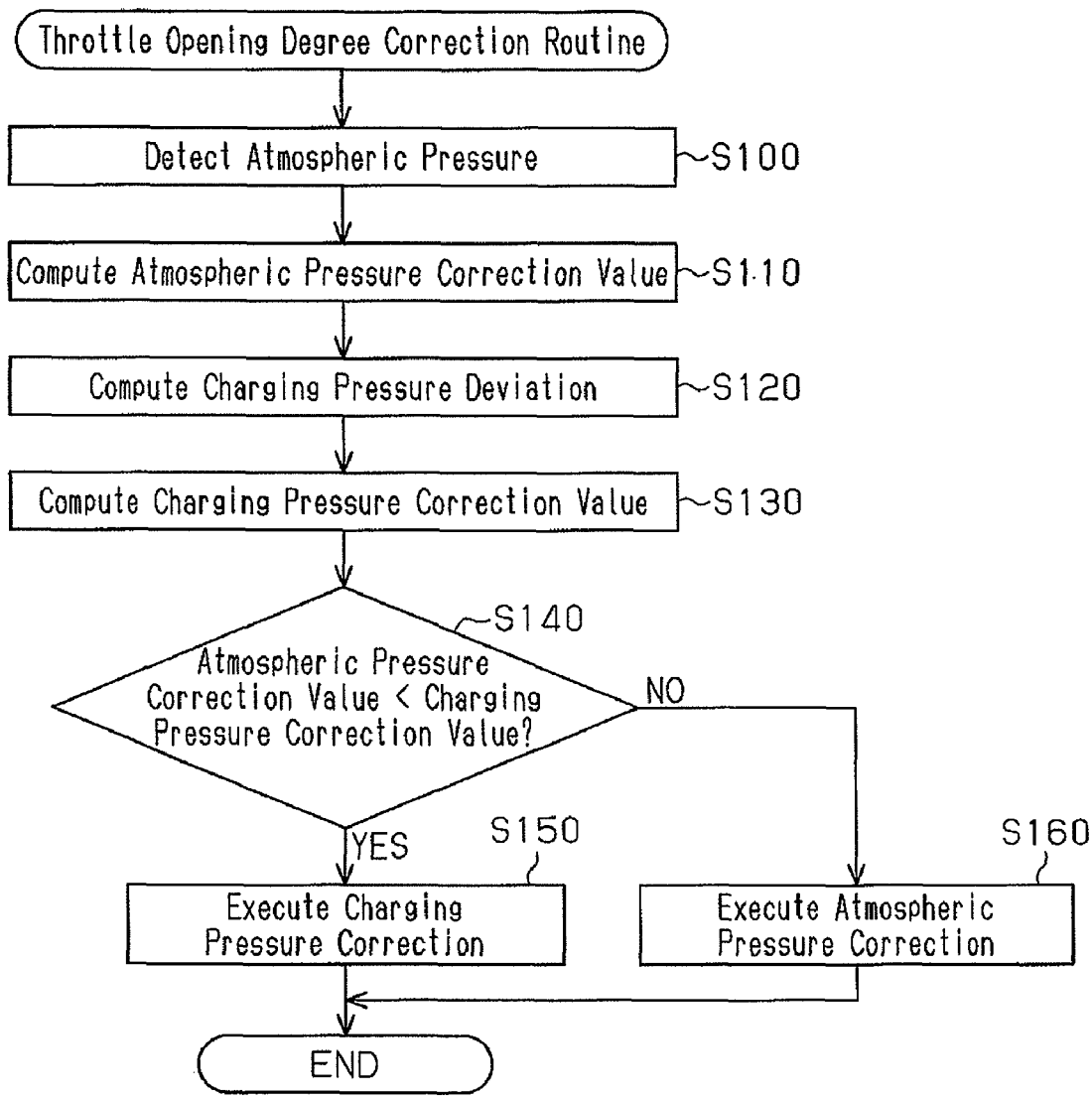

THROTTLE CONTROLLING APPARATUS FOR DIESEL ENGINE WITH SUPERCHARGER

FIELD OF THE INVENTION

The present invention relates to a throttle controlling apparatus for a diesel engine with a supercharger, which apparatus corrects the throttle opening degree in accordance with the atmospheric pressure.

BACKGROUND OF THE INVENTION

The output of a typical diesel engine mounted on, for example, a vehicle, is controlled by adjusting the amount of fuel injection. Therefore, the throttle opening degree is not finely controlled. During recent years, diesel engines with an exhaust gas recirculation device, or an EGR device have been developed. When using an EGR device, the amount of exhaust gas that is recirculated with intake air, or the EGR amount, needs to be finely controlled. For example, Japanese Laid-Open Patent Publication No. 2002-327643 discloses a diesel engine with an electronically controlled throttle valve that is capable of finely control the throttle opening degree in accordance with the operating state of the engine.

When a diesel engine is operated under a low atmospheric pressure condition, for example, at high altitude, the amount of new air that is drawn from the outside is reduced. Therefore, under a low atmospheric pressure, the reduction in the intake amount of new air drawn from the outside needs to be compensated for. Particularly, in the case of a diesel engine with an EGR device, reduction in the amount of intake air under a low atmospheric pressure increases the EGR ratio, or the ratio of the EGR amount in the total amount of gas that fills the cylinder. The combustion state deteriorates accordingly. Thus, Japanese Laid-Open Patent Publication No. 9-60559 discloses a diesel engine that corrects the throttle opening degree in accordance with the atmospheric pressure, that is, performs atmospheric pressure correction (high altitude correction) of the throttle opening degree, thereby compensating for reduction in the amount of intake air under a low atmospheric pressure.

Normally, the atmospheric pressure correction value of the throttle opening degree is obtained by referring to a one-dimensional computation map based on the atmospheric pressure shown in FIG. 7. The computation map stores appropriate atmospheric pressure correction values (A0, A1, ..., An) that correspond to the values of the atmospheric pressure (P0, P1, ..., Pn). A base value (base opening degree) of the throttle opening degree, which is computed based on the engine speed and the engine load, is corrected by using an atmospheric pressure correction value obtained from the computation map, so that a final throttle opening degree is set.

Through such an atmospheric pressure correction of the throttle opening degree, the reduction of intake air under a low atmospheric pressure is compensated for. However, if the correction of the throttle opening degree in accordance with the atmospheric pressure is executed in a uniform method for all the engine operating conditions, the following drawbacks occur.

The emission controllability of the EGR at high altitude deteriorates. Depending on the engine operating condition, the EGR ratio is set to a value near limitation beyond which deterioration of the combustion state cannot be avoided. Under such an engine operating condition, if the EGR ratio is increased by reduction in the amount of intake air due to a low atmospheric pressure, the combustion state immediately deteriorates. Therefore, the above described atmospheric pressure correction of the throttle opening degree needs to be performed such that the combustion state does not deteriorate even under an engine operating condition where the EGR ratio has little margin. On the other hand, depending on the engine operating condition, the EGR ratio is set to a value that does not cause the combustion state to deteriorate even if the EGR ratio is increased by a certain degree under the normal atmospheric pressure. In such an engine operation condition, where the EGR ratio has a sufficient margin, if the atmospheric pressure correction of the throttle opening is performed on the assumption that the engine operating condition has little margin, the correction will be excessive. Thus, the improvement of the emission performance by the EGR will be limited.

Also, if the atmospheric pressure correction of the throttle opening degree is executed in a uniform manner for all the engine operating conditions, the controllability of the exhaust temperature at high altitude is likely to deteriorate. Depending on the engine operation condition, the discharge amount of substances such as HC under the normal atmospheric pressure can be close to an allowable limit. Under such an engine operation condition, if the exhaust temperature increases due to a reduction in intake air under a low atmospheric pressure, the discharge amount of substances such as HC immediately surpasses the allowable limit. Therefore, the above described atmospheric pressure correction of the throttle opening degree needs to be performed such that the discharge amount of substances such as HC does not surpass the allowable limit even when the discharge amount has little margin. On the other hand, depending on the engine operating condition, the discharge amount of substances such as HC under the normal atmospheric pressure is sufficiently small. Thus, even if the discharge amount of such substances is increased due to a reduction in the intake air under a low atmospheric pressure, the discharge amount of such substances can be kept within an allowable range. Under an engine operating condition where the discharge amount of substances such as HC has a sufficient margin, if the atmospheric pressure correction of the throttle opening is performed on the assumption that the discharge amount of substances such as HC has little margin, the amount of intake air is excessively increased, so that the exhaust temperature is excessively lowered. This may hamper the temperature increase control of an exhaust purification catalyst.

Also, if the atmospheric pressure correction of the throttle opening degree is executed in a uniform manner for all the engine operating conditions, the controllability of the air-fuel ratio at high altitude is likely to deteriorate. In a diesel engine with an exhaust purification catalyst of NOx storage reduction type, sulfur component in exhaust gas is gradually accumulated in the exhaust purification catalyst, and the purification performance of NOx component is degraded. That is, sulfur poisoning occurs. Therefore, in such a diesel engine, the sulfur release control needs to be carried out in which the air-fuel ratio of air-fuel mixture is temporarily made rich according to the progress of sulfur poisoning, so as to remove sulfur component accumulated in the exhaust purification catalyst. On the other hand, the air-fuel ratio of air-fuel mixture to be burned varies according to the engine operating condition even under the normal atmospheric pressure. Depending on the engine operating condition, the air-fuel ratio under the normal atmospheric pressure is set to a value close to the limit on the rich side in an air-fuel ratio range allowing satisfactory combustion to continue. If the air-fuel ratio is made rich by reduction in intake air amount under a low atmospheric pressure, the combustion state may immediately deteriorates. Under such an engine operating condition, the above described atmospheric pressure correction of throttle opening degree needs to be performed so as to maintain the air-fuel ratio in the range that allows satisfactory combustion state to continue. On the other hand, in some cases, the diesel engine is operated at a relatively lean air-fuel ratio under the normal atmospheric pressure, depending on the engine operating condition. In such an engine operation condition, which has a sufficient margin for the air-fuel ratio to be made richer, if the atmospheric pressure correction of the throttle opening is performed on the assumption that the engine operating condition has little margin for making the air-fuel ratio richer, the intake air amount will be excessive, and the air-fuel ratio will be excessively lean. Even if the sulfur release control is executed in such a state, the air-fuel ratio cannot be made sufficiently rich, and the catalyst cannot be recovered from the sulfur poisoning.

As described above, if the atmospheric pressure correction of the throttle opening degree is executed in a uniform manner for all the engine operating conditions, the controllability of various parameters will be degraded as shown above. Such problems can be avoided by computing the atmospheric correction value by taking into consideration not only the atmospheric pressure, but also other parameter such as the charging pressure. However, in such a case, the computation of the atmospheric pressure correction value needs to be executed using two- or more dimensional map. Creation of such a map requires a great number of adaption steps. The capacity of such a map is inevitably increased and thus reduces the open storage space.

SUMMARY OF THE INVENTION

Accordingly, it is an objective of the present invention to provide a throttle controlling apparatus for a diesel engine with a supercharger, which apparatus is capable of performing atmospheric pressure correction of the throttle opening degree in a satisfactory manner while preventing the control procedure from being complicated.

To achieve the foregoing objective and in accordance with a first aspect of the present invention, an apparatus for controlling a throttle opening degree of a diesel engine with a supercharger is provided. The apparatus includes a detecting section that detects the atmospheric pressure, a computing section that computes an atmospheric pressure correction value with respect to the throttle opening degree based on the detected atmospheric pressure, a correcting section that corrects the throttle opening degree in accordance with the atmospheric pressure correction value, a correction limiting/inhibiting section. When the degree of separation of an actual charging pressure from a target charging pressure in the supercharger is les than a predetermined value, the correction limiting/inhibiting section limits or inhibits correction of the throttle opening degree in accordance with the atmospheric pressure correction value.

In accordance with a second aspect of the present invention, an apparatus for controlling a throttle opening degree of a diesel engine with a supercharger is provided. The apparatus includes a detecting section that detects the atmospheric pressure, a computing section that computes an atmospheric pressure correction value with respect to the throttle opening degree based on the detected atmospheric pressure, a correcting section that corrects the throttle opening degree in accordance with the atmospheric pressure correction value, and a correction permitting section that permits the correction section to correct the throttle opening degree in accordance with the atmospheric pressure correction value only when the degree of separation of an actual charging pressure from a target charging pressure in the supercharger is greater than a predetermined value.

In accordance with a third aspect of the present invention, an apparatus for controlling a throttle opening degree of a diesel engine with a supercharger is provided. The apparatus includes a detecting section that detects the atmospheric pressure, a first computing section that computes an atmospheric pressure correction value with respect to the throttle opening degree based on the detected atmospheric pressure, a second computing section that computes a charging pressure correction value with respect to the throttle opening degree based on the deviation of an actual charging pressure from a target charging pressure in the supercharger, and a correcting section that selects, of the atmospheric pressure correction value and the charging pressure correction value, a correction value that causes the throttle opening degree to be corrected by a smaller degree, and corrects the throttle opening degree according to the selected correction value.

Other aspects and advantages of the present invention will become apparent from the following description, taken into conjunction with the accompanying illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart showing a procedure of a throttle opening degree correction routine according to the second embodiment; and FIG. 7 is a chart representing one example of a map for computing an atmospheric pressure correction value used in a conventional throttle operating apparatus for a diesel engine.

DETAILED DESCRIPTION OF THE PREFERRED EMBODIMENTS

A throttle controlling apparatus for a diesel engine with a supercharger according to a first embodiment of the present invention will now be described with reference to FIGS. 1 to 4.

Figure 1:
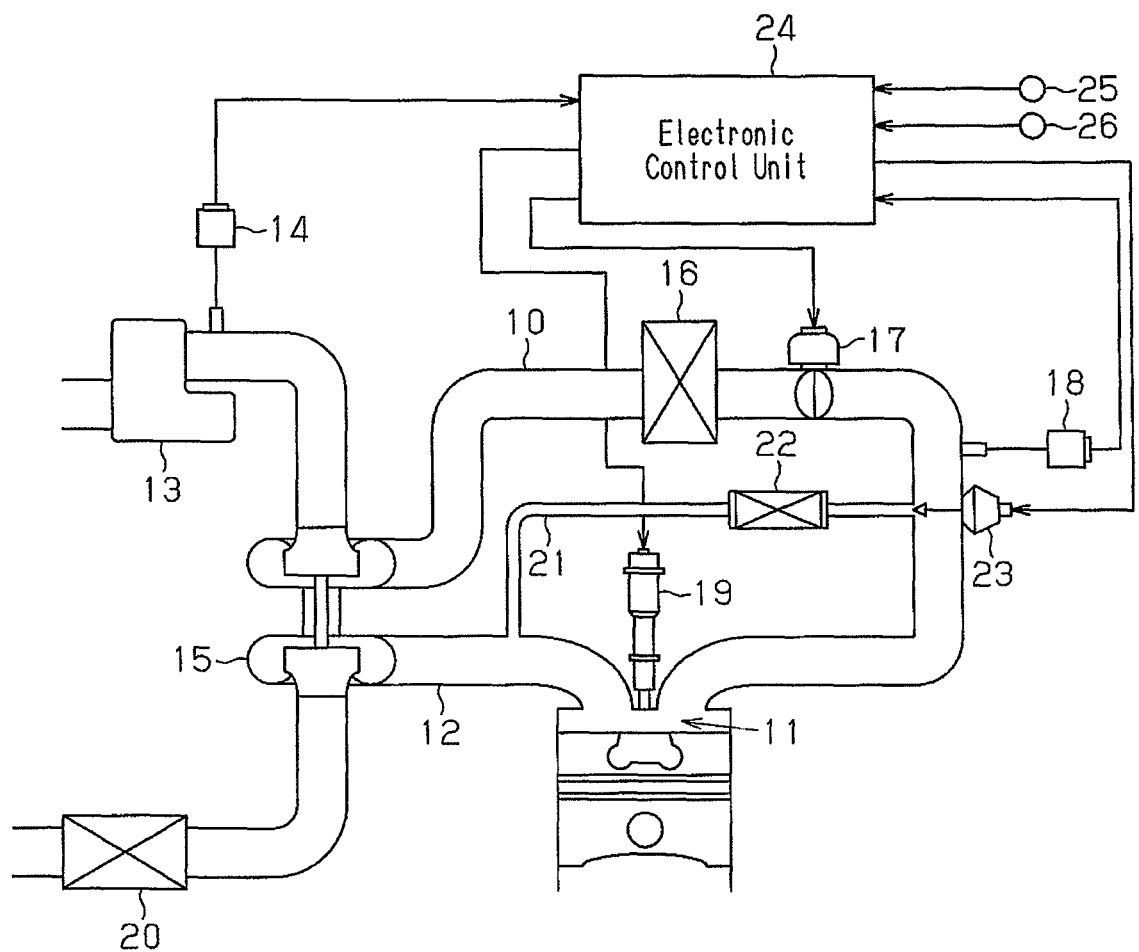
FIG. 1 is a diagram schematically showing the configuration of a diesel engine with a supercharger according to a first embodiment of the present invention.

As shown in FIG. 1, the diesel engine with a supercharger includes an intake passage 10, a combustion chamber 11, and an exhaust passage 12. Although only one combustion chamber 11 is shown in FIG. 1, the engine actually has multiple combustion chambers.

In the intake passage 10, an air cleaner 13 that cleans new air drawn from the outside, an atmospheric pressure sensor 14 for detecting the atmospheric pressure, and a turbocharger 15 are provided in this order from the upstream side. The turbocharger 15 rotates a turbine with exhaust gas to drive a compressor, thereby executing supercharging. Also, in a section of the intake passage 10 that is downstream of the turbocharger 15, an intercooler 16, a throttle valve 17, and a charging pressure sensor 18 are arranged in this order. The intercooler 16 cools new air that has been heated by adiabatic compression effect of the turbocharger 15. The throttle valve 17 adjusts the flow rate of new air flowing through the intake passage 10. The charging pressure sensor 18 detects the pressure of the new air that has been supercharged by the turbocharger 15, that is, the charging pressure.

Air that has been drawn in through the intake passage 10 is conducted to the combustion chamber 11. A fuel injection valve 19 is located above the combustion chamber 11. Fuel injected by the fuel injection valve 19 is burned in the combustion chamber 11. Exhaust gas produced after combustion in the combustion chamber 11 is discharged to the exhaust passage 12. An exhaust purification catalyst 20 of NOx storage reduction type is arranged in the exhaust passage 12. The exhaust gas discharged to the exhaust passage 12 is blown onto the turbine wheel of the turbocharger 15, and then purified by the exhaust purification catalyst 20. The purified exhaust gas is discharged to the outside.

The diesel engine has an exhaust gas recirculation (EGR) device, which recirculates exhaust gas to intake air. The exhaust gas recirculation device includes an EGR passage 21 that connects the exhaust passage 12 to the intake passage 10, the EGR cooler 22 that cools recirculated exhaust gas, and an EGR valve 23 that selectively inhibits and permits recirculation of exhaust gas. The amount of exhaust gas that is recirculated to intake air through the exhaust gas recirculation device, that is, the EGR amount is adjusted through controlling the opening degree of the throttle valve 17. That is, when the opening degree of the throttle valve 17 is reduced to decrease the amount of intake amount of new air, the EGR amount is increased correspondingly. In contrast, when the opening degree of the throttle valve 17 is increased to increase the intake amount of new air, the EGR amount is decreased correspondingly.

The diesel engine is controlled by an electronic control unit 24. The electronic control unit 24 includes a central processing unit (CPU) that executes various types of computation processes related to the engine control, a read-only memory (ROM) that stores control programs and data, a random access memory (RAM) that temporarily stores computation results of the CPU, and an input-output port (I/O) that inputs and outputs signals from and to the outside.

In addition to the atmospheric pressure sensor 14 and the charging pressure sensor 18, various sensors that detect the operation state of the engine are connected to the input port of the electronic control unit 24. The sensors include an NE sensor that detects the engine speed, a pedal position sensor (accelerator operating amount sensor) 26 that detects the depression amount of the accelerator pedal (the operation amount of the accelerator). The electronic control unit 24 determines the current engine operating state from the detection results of these sensors, and executes fuel injection control of the fuel injection valve 19, and the opening degree control of the throttle valve 17 and the EGR valve 23.

The electronic control unit 24 executes sulfur release control of the exhaust purification catalyst 20 as necessary. That is, the electronic control unit 24 monitors the progress of sulfur poisoning of the exhaust purification catalyst 20. When sulfur poisoning has progressed to a certain degree, the electronic control unit 24 increases the fuel injection amount, thereby temporarily making the air-fuel ratio of air-fuel mixture rich. By making the air-fuel ratio rich, a great amount of unburned fuel component is supplied to the exhaust purification catalyst 20, so that the temperature of the catalyst 20 is raised. This removes the sulfur accumulated in the catalyst 20.

Hereafter, the procedure of throttle opening degree control of the diesel engine according to the present embodiment will be described.

The electronic control unit 24 computes an opening degree command value of the throttle valve 17 in the following manner, and controls the throttle valve 17 in accordance with the computed opening degree command value. 0% of the opening degree command value represents the fully closed state the throttle valve 17, and 100% of the value represents the fully open state of the throttle valve 17. Thus, the smaller the opening degree command value, the greater the opening degree of the throttle valve 17, and the greater the opening degree command value, the smaller the opening degree of the throttle valve 17.

Figures 2, 3:
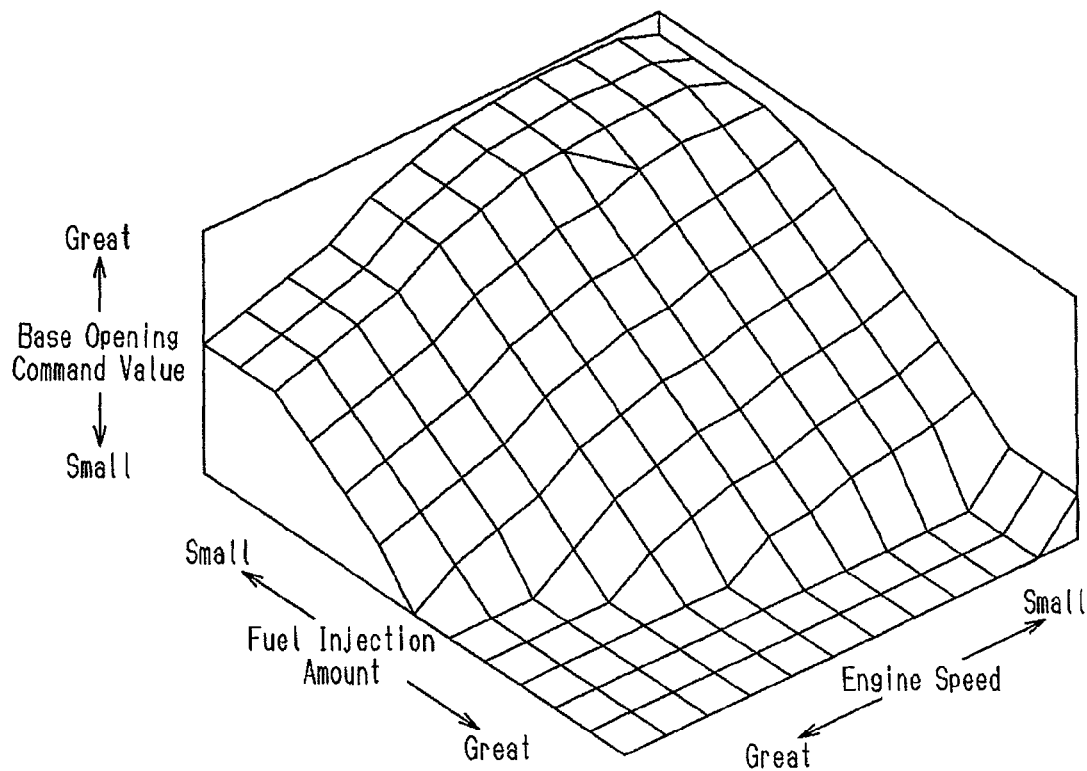
FIG. 2 is a graph showing the relationship among the engine speed, the fuel injection amount, and the base opening degree in a base opening degree computing map used in the diesel engine shown in FIG. 1.
FIG. 3 is a chart representing one example of a map for computing an atmospheric pressure compensation value.

When computing the opening degree command value, the electronic control unit 24 first computes a base opening degree command value. The base opening degree command value is computed by using a two-dimensional computation map, which is stored in the ROM of the electronic control unit 24 in advance. As shown in FIG. 2, the computation map defines the relationship of the base opening degree command value to the engine speed and the engine load. In the present embodiment, the fuel injection amount is used as an index value of the engine load. As shown in FIG. 2, the base opening degree command value is basically reduced as the fuel injection amount is increased, or as the engine speed is increased.

After computing the base opening degree command value in this manner, the electronic control unit 24 computes an atmospheric pressure correction value based on the atmospheric pressure detected by the atmospheric pressure sensor 14. The atmospheric pressure correction value is computed by using a one-dimensional map that is based on the atmospheric pressure and stored in the ROM of the electronic control unit 24 in advance. As shown in FIG. 3, the computation map defines the relationship of the atmospheric pressure correction value to the atmospheric pressure. The atmospheric pressure correction value is in range from 0 to 1. Basically, the lower the atmospheric pressure, the smaller the atmospheric pressure correction value becomes. As shown in FIG. 3, the atmospheric pressure correction value is set to 1 at a normal atmospheric pressure at sea level, which is 101.3 MPa, and at higher atmospheric pressures. In contrast, the atmospheric pressure correction value is set to a value less than 1 under low atmospheric pressures, for example, at high altitudes.

The electronic control unit 24 multiplies the base opening degree command value by the computed atmospheric pressure correction value, thereby performing the atmospheric pressure correction of the throttle opening degree. That is, the final opening degree command value of the throttle valve 17 is the product of the atmospheric pressure correction value and the base opening degree command value. Therefore, when the atmospheric pressure correction value is set to a value less than 1, the opening degree command value of the throttle valve 17 after the atmospheric correction will be less than the base opening degree command value. That is, the throttle valve 17 is controlled to an opening degree that is greater than the opening degree indicated by the base opening degree command value.

As described above, if the atmospheric pressure correction of the throttle opening degree is executed in a uniform method under all the engine operating conditions, the controllability of emission of EGR, the controllability of the exhaust temperature, and the controllability of the air-fuel ratio at high altitudes will deteriorate. In this regard, the atmospheric pressure correction of the throttle opening degree is selectively inhibited or permitted in accordance with the degree of separation of the actual charging pressure from a target charging pressure in the present embodiment. The target charging pressure is a target value of the charging pressure that is determined in accordance with the current engine operating condition. Specifically, the target charging pressure is computed based on the engine speed and the depression degree of the accelerator pedal. The actual charging pressure refers to the charging pressure detected by the charging pressure sensor 18. The ratio of the actual charging pressure to the target charging pressure is used as an index value of the degree of the separation. When the ratio is more than or equal to a correction execution determining value, the atmospheric pressure correction of the throttle opening degree is permitted, and when the ratio is less than the determining value, the atmospheric pressure correction of the throttle opening degree is inhibited. Thus, under a condition where sufficient supercharging is possible, for example, during a high load and high speed operation of the diesel engine, the atmospheric pressure correction of the throttle opening degree is inhibited. The atmospheric pressure correction of the throttle opening degree is permitted only when sufficient supercharging by the turbocharger 15 is impossible, for example, during a low load and low speed operation.

Figures 4, 5:
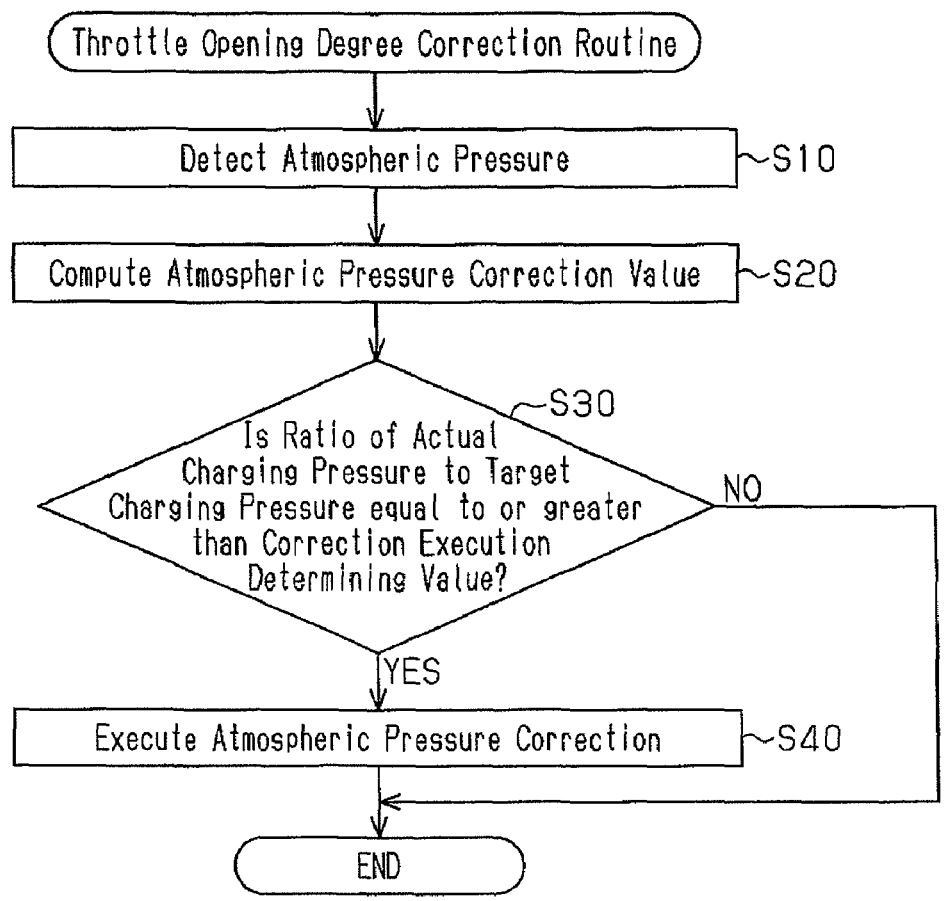
FIG. 4 is a flowchart showing a procedure of a throttle opening degree correction routine according to the first embodiment.
FIG. 5 is a chart representing one example of a map for computing a charging pressure correction value according to a second embodiment of the present invention.

FIG. 4 is a flowchart showing a throttle opening degree correction routine for executing the atmospheric pressure correction of the throttle opening degree as described above. The process of this routine is executed by the electronic control unit 24 after the above described base opening degree command value is computed.

When the routine is started, the electronic control unit 24 first detects the atmospheric pressure by reading a detection signal from the atmospheric pressure sensor 14 at S10. Next, at step S20, the electronic control unit 24 computes the atmospheric pressure correction value based on the detected atmospheric pressure using a computation map as shown in FIG. 3.

After computing the atmospheric pressure correction value, the electronic control unit 24 determines whether the ratio of the charging pressure to a target charging pressure is more than or equal to a correction execution determination value at step S30. If the ratio is more than or equal to the correction execution determination value (YES at step S30), the electronic control unit 24 executes the atmospheric pressure correction throttle opening degree. That is, the electronic control unit 24 multiplies the base opening degree command value by the atmospheric pressure correction value and sets the resultant as the final opening degree command value of the throttle valve 17. In contrast, if the ratio is less than correction execution determination value (NO at step S30), the electronic control unit 24 ends the process of the routine without executing the atmospheric pressure correction of the throttle opening degree. That is, the electronic control unit 24 sets the base opening degree command value as the final opening degree command value of the throttle valve 17.

The electronic control unit 24 functions as a detecting section, a computing section, a correcting section, a correction limiting/inhibiting section, and a correction permitting section. In the present embodiment, step S20 in the throttle opening degree correction routine corresponds to the process executed by the computing section. Also, step S40 corresponds to the process executed by the correcting section. Further, step S30 corresponds to the processes executed by the correction limiting/inhibiting section and the correction permitting section.

The present embodiment provides the following advantages.

(1) In the present embodiment, the atmospheric pressure correction value of the throttle degree is computed based on the detection result of the atmospheric pressure, and the throttle opening degree is corrected based on the computed atmospheric pressure correction value. When the degree of separation of the actual charging pressure from the target charging pressure is less than a predetermined value, the atmospheric pressure correction of the throttle opening degree is limited. Specifically, the atmospheric pressure correction is inhibited. In other words, the atmospheric pressure correction of throttle opening degree is permitted only when the degree of separation of the actual charging pressure from the target charging pressure is greater than the predetermined value. Thus, unnecessary executions of the atmospheric pressure correction of throttle opening degree is suppressed by adding simple logic, in which the degree of separation of the actual charging pressure from the target charging pressure is first determined, and whether to limit (inhibit) or permit the atmospheric pressure correction in accordance with the degree of separation. Therefore, the atmospheric pressure correction of throttle opening degree is executed more reliably, while preventing the procedure from being complicated.

(2) In the present embodiment, unnecessary executions of the atmospheric pressure correction of throttle opening degree are suppressed by providing only a single one-dimensional computation map based on the atmospheric pressure as a map for correcting the throttle opening degree. Thus, the number of adaption steps for creating the computation map is suppressed from increasing, and the storage capacity of the controlling apparatus required for storing the computation map is also reduced.

(3) In a diesel engine having an exhaust gas recirculation device, atmospheric pressure correction may be executed unnecessarily, which excessively reduces the EGR ratio. This can degrade the emission performance. However, in the present embodiment, unnecessary execution of the atmospheric pressure correction of throttle opening degree is inhibited when the degree of separation of the actual charging pressure from the target charging pressure is small. Thus, such deterioration of the emission performance is reliably prevented.

(4) In the diesel engine with the supercharger according to the present embodiment, the sulfur release control for the exhaust purification catalyst 20 is executed by making the air-fuel ratio richer as necessary. In a diesel engine that performs sulfur release control for the exhaust purification catalyst 20, if the air-fuel ratio is made excessively lean through excessive execution of the atmospheric pressure correction, the sulfur release control, which is started by making the air-fuel ratio rich, cannot be executed appropriately. However, in the present embodiment, unnecessary execution of the atmospheric pressure correction of throttle opening degree is inhibited when the degree of separation of the actual charging pressure from the target charging pressure is small. Accordingly, inappropriate execution of the sulfur release control caused by the result of the atmospheric pressure correction is reliably avoided.

A throttle controlling apparatus for a diesel engine with a supercharger according to a second embodiment of the present invention will now be described with reference to FIGS. 5 and 6. The differences from the first embodiment will mainly be discussed. In the following embodiments, like or the same reference numerals are given to those components that are like or the same as the corresponding components of the first embodiment.

In the first embodiment, whether to execute the correction of the throttle opening degree in accordance with the atmospheric pressure correction value is determined according the degree of separation of the actual charging pressure from the target charging pressure. That is, when sufficient supercharging is being performed and the atmospheric pressure correction of throttle opening degree is not necessary, the atmospheric pressure correction is inhibited. In the present embodiment, unnecessary execution of the atmospheric pressure correction of throttle opening degree is avoided in the following manner. That is, in addition to the above described atmospheric pressure correction value, a charging pressure correction value, which is computed based on the deviation of the actual charging pressure from the target charging pressure is obtained as a correction value of the throttle opening degree. Then, the atmospheric pressure correction value is compared with the charging pressure correction value, and the correction value of a smaller degree of correction of the throttle opening degree is selected. The correction of the throttle opening degree is executed using the selected correction value.

In the present embodiment, the charging pressure correction value is computed using a one-dimensional computation map based on the deviation [kPa] between the target charging pressure and the actual charging pressure shown in FIG. 5. The charging pressure correction value is in range from 0 to 1. When the actual charging pressure is equal to the target charging pressure, that is, when the deviation is 0, the charging pressure correction value is set to 1. The greater the deviation is, the smaller the charging pressure correction value becomes.

Such correction of the throttle opening degree using the charging pressure correction value, that is, the charging pressure correction of the throttle opening degree, is executed by multiplying the base opening degree command value of the throttle valve 17 by the charging pressure correction value. Therefore, when the deviation of the actual charging pressure from the target charging pressure is great and the charging pressure correction value is less than 1, the final opening degree command value of the throttle valve 17 after the charging pressure correction will be less than the base opening degree command value. That is, the throttle valve 17 is controlled to an opening degree that is greater than the opening degree indicated by the base opening degree command value.

The smaller the atmospheric pressure correction value and the charging pressure correction value, which are determined in the above described manners, the greater the degree of correction of the throttle opening achieved by using the correction values becomes. Therefore, the greater one of the atmospheric pressure correction value and the charging pressure correction value causes the throttle opening degree to be corrected by a smaller degree.

FIG. 6 is a flowchart showing a throttle opening degree correction routine for correcting the throttle opening degree as described above. The process of this routine is executed by the electronic control unit 24 after the above described base opening degree command value is computed.

When the routine is started, the electronic control unit 24 first detects the atmospheric pressure by reading a detection signal from the atmospheric pressure sensor 14 at S100. Next, at step S110, the electronic control unit 24 computes the atmospheric pressure correction value based on the detected atmospheric pressure using a computation map as shown in FIG. 3.

After computing the atmospheric pressure correction value, the electronic control unit 24 computes a charging pressure deviation, or the deviation of the actual charging pressure from the target charging pressure, at step S120. At step S130, the electronic control unit 24 computes a charging pressure correction value based on the computed deviation using a computation map as shown in FIG. 5.

After computing the atmospheric pressure correction value and the charging pressure correction value, the electronic control unit 24 compares the correction values at step S140, and determines which one is greater, that is, which correction value will cause the throttle opening degree to be corrected by a smaller degree. When the charging pressure correction value is greater than the atmospheric pressure correction value (YES at step S140), the electronic control unit 24 only executes the charging pressure correction at step S150 and temporarily suspends the current routine. That is, the electronic control unit 24 multiplies the base opening degree command value by the charging pressure correction value and sets the resultant as the final opening degree command value of the throttle valve 17. On the other hand, when the atmospheric pressure correction value is greater than the charging pressure correction value (NO at step S140), the electronic control unit 24 only executes the atmospheric pressure correction at step S160 and temporarily suspends the current routine. That is, the electronic control unit 24 in this state multiplies the base opening degree command value by the atmospheric pressure correction value and sets the resultant as the final opening degree command value of the throttle valve 17.

The electronic control unit 24 functions as a first computing section, a second computing section, and a correcting section. In the present embodiment, step S110 in the throttle opening degree correction routine corresponds to the process executed by the first computing section. Also, step S130 corresponds to the process executed by the second computing section. Also, steps S140 to S160 correspond to the process executed by the correcting section.

In addition to the advantages (3) and (4), the present embodiment provides the following advantages.

(5) In the present embodiment, the atmospheric pressure correction value of the throttle degree is computed based on the detection result of the atmospheric pressure, and the charging pressure correction value of the throttle opening degree is computed based on the deviation between the target charging pressure and the actual charging pressure. Of the atmospheric pressure correction value and the charging pressure correction value, only the correction value that causes the throttle opening degree to be corrected by a smaller degree is used to execute the correction of the throttle opening degree. When the degree of the correction of the throttle opening degree using the charging pressure correction value is less than the degree of correction using the atmospheric pressure correction value, the throttle opening degree is corrected based only on the deviation between the target charging pressure and the actual charging pressure, and no correction based on the atmospheric pressure is executed. Therefore, unnecessary executions of the atmospheric pressure correction of throttle opening degree is suppressed by adding simple logic. As a result, the atmospheric pressure correction of throttle opening degree is executed more reliably, while preventing the procedure from being complicated.

(6) In the present embodiment, both of the computation map based on the atmospheric pressure and the computation map based on the deviation between the target charging pressure and the actual charging pressure are one-dimensional computation map. Thus, the number of adaption steps for creating the computation map is suppressed from increasing, and the storage capacity of the controlling apparatus required for storing the computation map is also reduced.

The above described embodiments may be modified as follows.

In the first embodiment, when the ratio of the actual charging pressure to the target charging pressure is less than correction execution determination value, the atmospheric pressure correction is inhibited completely. However, the atmospheric pressure correction may be limited to reduce the degree of the atmospheric pressure correction of throttle opening degree compared to the normal control. In such a case also, it is possible to suppress unnecessary execution of the atmospheric pressure correction to a certain extent.

In the first embodiment, the ratio of the actual charging pressure to the target charging pressure is used as an index value indicating the degree of separation of the actual charging pressure from the target charging pressure. However, the deviation of the actual charging pressure from the target charging pressure may be used.

In the above described embodiments, the base opening degree command value is multiplied by a correction value (the atmospheric pressure correction value, the charging pressure correction value) to correct the throttle opening degree. However, the throttle opening degree may be corrected by adding a correction value to or subtracting a correction value from the base opening degree command value. In this case, one of the atmospheric pressure correction value and the charging pressure correction value that has the smaller absolute value can correspond to a correction value with which the throttle opening degree is corrected by a smaller degree.

In the above described embodiments, the present invention is applied to a diesel engine having a supercharger that includes an exhaust gas recirculation device. However, the present invention may be applied to a diesel engine having a supercharger that includes no exhaust gas recirculation device. Even in a diesel engine having a supercharger with no exhaust gas recirculation device, unnecessary execution of atmospheric pressure correction causes a drawback that the controllability of the exhaust temperature and the air-fuel ratio at high altitude deteriorate. Such a drawback is prevented by applying the present invention.

In the above described embodiments, the present invention is applied to a diesel engine in which an exhaust purification catalyst of NOx storage reduction type is located in the exhaust purification catalyst 20, and sulfur release control is executed as necessary. However, the present invention may be applied to a diesel engine with a supercharger that does not execute sulfur release control. Even in such a diesel engine, unnecessary execution of atmospheric pressure correction causes a drawback that the emission controllability and the exhaust temperature controllability deteriorate. Such a drawback is prevented by applying the present invention.

In the illustrated embodiments, the present invention is applied to a diesel engine having the turbocharger 15 as a supercharger. However, the present invention may be applied to a diesel engine having other types of superchargers.

What is claimed is:

1. An apparatus for controlling a throttle opening degree of a diesel engine with a supercharger, comprising:
    a computing section that computes an atmospheric pressure correction value with respect to a throttle opening degree based on a detected atmospheric pressure;
    an atmospheric pressure correcting section that corrects the throttle opening degree in accordance with the atmospheric pressure correction value; and
    a correction limiting section, wherein, when the degree of separation of an actual charging pressure from a target charging pressure is less than a predetermined value, the correction limiting section limits correction of the throttle opening degree in accordance with the atmospheric pressure correction value.

2. The apparatus according to claim 1, wherein the diesel engine includes an exhaust gas recirculation device that recirculates exhaust gas to air drawn into the engine.

3. The apparatus according to claim 1, wherein the diesel engine includes an exhaust purification catalyst of NOx storage reduction type, and wherein the diesel engine is capable of executing sulfur release control, in which the air-fuel ratio is made rich, so as to remove sulfur component accumulated in the exhaust purification catalyst.

4. An apparatus for controlling a throttle opening degree of a diesel engine with a supercharger, comprising:
    a computing section that computes an atmospheric pressure correction value with respect to a throttle opening degree based on a detected atmospheric pressure;
    an atmospheric pressure correcting section that corrects the throttle opening degree in accordance with the atmospheric pressure correction value; and
    a correction permitting section that permits the correction section to correct the throttle opening degree in accordance with the atmospheric pressure correction value only when the degree of separation of an actual charging pressure from a target charging pressure is greater than a predetermined value.

5. The apparatus according to claim 4, wherein the diesel engine includes an exhaust gas recirculation device that recirculates exhaust gas to air drawn into the engine.

6. The apparatus according to claim 4, wherein the diesel engine includes an exhaust purification catalyst of NOx storage reduction type, and wherein the diesel engine is capable of executing sulfur release control, in which the air-fuel ratio is made rich, so as to remove sulfur component accumulated in the exhaust purification catalyst.

7. An apparatus for controlling a throttle opening degree of a diesel engine with a supercharger, comprising:
    a computing section that computes an atmospheric pressure correction value with respect to a throttle opening degree based on a detected atmospheric pressure;
    a charging pressure correction value computing section that computes a charging pressure correction value with respect to the throttle opening degree based on the deviation of an actual charging pressure from a target charging pressure; and
    a selection correcting section that compares the atmospheric pressure correction value and the charging pressure correction value with each other, selects, of the atmospheric pressure correction value and the charging pressure correction value, a correction value that causes the throttle opening degree to be corrected by a smaller degree, and corrects the throttle opening degree according to the selected correction value.

8. The apparatus according to claim 7, wherein the diesel engine includes an exhaust gas recirculation device that recirculates exhaust gas to air drawn into the engine.

9. The apparatus according to claim 7, wherein the diesel engine includes an exhaust purification catalyst of NOx storage reduction type, and wherein the diesel engine is capable of executing sulfur release control, in which the air-fuel ratio is made rich, so as to remove sulfur component accumulated in the exhaust purification catalyst.

10. An apparatus for controlling a throttle opening degree of a diesel engine with a supercharger, comprising:

a computing section that computes an atmospheric pressure correction value with respect to a throttle opening degree based on a detected atmospheric pressure;

an atmospheric pressure correcting section that corrects the throttle opening degree in accordance with the atmospheric pressure correction value; and a correction inhibiting section, wherein, when the degree of separation of an actual charging pressure from a target charging pressure is less than a predetermined value, the correction inhibiting section inhibits correction of the throttle opening degree in accordance with the atmospheric pressure correction value.

11. The apparatus according to claim 10, wherein the diesel engine includes an exhaust gas recirculation device that recirculates exhaust gas to air drawn into the engine.

12. The apparatus according to claim 10, wherein the diesel engine includes an exhaust purification catalyst of NOx storage reduction type, and wherein the diesel engine is capable of executing sulfur release control, in which the air-fuel ratio is made rich, so as to remove sulfur component accumulated in the exhaust purification catalyst.

* * * * *